United States Patent
Lin et al.

(10) Patent No.: US 11,928,132 B2
(45) Date of Patent: Mar. 12, 2024

(54) DATABASE PROCESSING METHOD AND APPARATUS, AND COMPUTER-READABLE STORAGE MEDIUM

(71) Applicant: ZTE CORPORATION, Guangdong (CN)

(72) Inventors: Pin Lin, Guangdong (CN); Yan Ding, Guangdong (CN); Qinyuan Lu, Guangdong (CN); Chen Qi, Guangdong (CN); Yifang Yu, Guangdong (CN); Pei Zhao, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 95 days.

(21) Appl. No.: 17/615,581

(22) PCT Filed: Apr. 21, 2020

(86) PCT No.: PCT/CN2020/085848
§ 371 (c)(1),
(2) Date: Nov. 30, 2021

(87) PCT Pub. No.: WO2020/238485
PCT Pub. Date: Dec. 3, 2020

(65) Prior Publication Data
US 2022/0237209 A1    Jul. 28, 2022

(30) Foreign Application Priority Data
May 30, 2019  (CN) .......................... 201910464772.3

(51) Int. Cl.
*G06F 17/30* (2006.01)
*G06F 9/46* (2006.01)
(Continued)

(52) U.S. Cl.
CPC ............ *G06F 16/284* (2019.01); *G06F 9/466* (2013.01); *G06F 16/2343* (2019.01); *G06F 16/252* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,037,476 B1 *  10/2011  Shavit .................... G06F 9/526
                                                      712/228
8,954,974 B1 *   2/2015  Accapadi ................ G06F 9/524
                                                      718/102
(Continued)

FOREIGN PATENT DOCUMENTS

CN       1808389 A       7/2006
CN     103885726 A       6/2014

OTHER PUBLICATIONS

International search report of PCT Patent Application No. PCT/CN2020/085848 dated Jul. 24, 2020.

*Primary Examiner* — Hung D Le
(74) *Attorney, Agent, or Firm* — CANTOR COLBURN LLP (57) ABSTRACT

Provided are a database processing method and apparatus, and a computer readable storage medium. The database processing method comprises: after a lock wait is generated, writing lock wait related information into a lock wait log.

10 Claims, 10 Drawing Sheets

101 after a lock wait is generated, writing lock wait related information into a lock wait log (51) Int. Cl.
  *G06F 16/23*  (2019.01)
  *G06F 16/25*  (2019.01)
  *G06F 16/28*  (2019.01)

(56) References Cited

U.S. PATENT DOCUMENTS

| | | | | |
|---|---|---|---|---|
| 2007/0234326 | A1* | 10/2007 | Kejariwal | G06F 9/30087 |
| | | | | 717/149 |
| 2009/0037416 | A1* | 2/2009 | Raghavan | G06F 16/2343 |
| 2009/0037417 | A1* | 2/2009 | Shankar | G06F 16/2343 |
| 2009/0271789 | A1* | 10/2009 | Babich | G06F 9/526 |
| | | | | 718/100 |
| 2010/0042584 | A1* | 2/2010 | Shavit | G06F 16/90344 |
| | | | | 707/E17.135 |
| 2010/0057965 | A1* | 3/2010 | Nir-Buchbinder | G06F 9/524 |
| | | | | 710/200 |
| 2011/0161539 | A1* | 6/2011 | Anand | G06F 9/526 |
| | | | | 710/200 |
| 2013/0013833 | A1* | 1/2013 | Nagpal | G06F 13/14 |
| | | | | 710/200 |
| 2015/0212934 | A1* | 7/2015 | Shanmugam | G06F 9/526 |
| | | | | 711/154 |
| 2015/0254113 | A1* | 9/2015 | Chiang | G06F 9/4856 |
| | | | | 718/102 |
| 2018/0011744 | A1* | 1/2018 | Liguori | G06F 9/4881 |
| 2020/0249857 | A1* | 8/2020 | Meiri | G06F 16/1774 |

\* cited by examiner

DATABASE PROCESSING METHOD AND APPARATUS, AND COMPUTER-READABLE STORAGE MEDIUM

CROSS-REFERENCE TO RELATED APPLICATIONS

This application claims the priority of Chinese patent application CN 201910464772.3, entitled "Database Processing Method and Apparatus, and Computer-readable Storage Medium" and filed on May 30, 2019, the entirety of which is incorporated herein by reference.

FIELD OF THE INVENTION

The embodiments of the present disclosure relate to, but not limited to a database processing method and apparatus, and a computer-readable storage medium.

BACKGROUND OF THE INVENTION

A database receives various services sent by a client, and converts the services to transactions on the database for concurrent running. Since a record in a table may be locked or the entire table may directly be locked during a transaction running process, this will generate a lock wait, which blocks the running of services. When it is found that the time a service runs increases and the performance of an entire system decreases, it would be conceivable for operation and maintenance personnel to query whether a lock wait was generated. However, a database only supports querying lock wait information that currently occurs, but cannot trace historical lock wait information.

During concurrent playback of the database, a lock wait usually results in a playback failure, and even results in playback thread suspending. It is late for troubleshooting after operation and maintenance personnel find a problem, because lock wait information at that time cannot be viewed now. Therefore, it is necessary to make an improvement for this problem.

SUMMARY OF THE INVENTION

The embodiments of the present disclosure provide a database processing method and apparatus, and a computer-readable storage medium, which improve the operation and maintenance efficiency for a database.

At least one embodiment of the present disclosure provides a database processing method, including: after a lock wait is generated, writing lock wait related information into a lock wait log.

At least one embodiment of the present disclosure provides a database processing apparatus, including a memory and a processor. The memory stores a program, and the program, when read and executed by the processor, implements the database processing method of any one of the embodiments.

At least one embodiment of the present disclosure provides a computer-readable storage medium. The computer-readable storage medium stores one or more programs, and the one or more programs may be executed by one or more processors to implement the database processing method of any one of the embodiments.

BRIEF DESCRIPTION OF THE DRAWINGS

The accompanying drawings are used to provide a further understanding of the technical solutions of the present disclosure and constitute a part of the description, and are used together with the embodiments of the present disclosure to explain the technical solutions of the present disclosure and do not constitute a limitation to the technical solutions of the present disclosure.

DETAILED DESCRIPTION OF THE EMBODIMENTS

In order to make the objectives, technical solutions and advantages of the present disclosure clearer, the embodiments of the present disclosure are further illustrated in details below in conjunction with the accompanying drawings. It should be noted that the embodiments in the present disclosure and the features in the embodiments can be combined arbitrarily with each other as long as there is no conflict.

The steps shown in the flowcharts of the accompanying drawings can be implemented in a computer system comprising such as a group of computer-executable instructions. Further, although a flowchart shows a logical sequence, in some cases, the steps that have been shown or described can be executed in a sequence different from this sequence.

In most cases, it is always necessary to query historical lock wait information during troubleshooting in a database. Therefore, recording of the historical lock wait information seems to be particularly important as it can help operation and maintenance personnel to precisely locate a problem. At least one embodiment of the present disclosure provides a database processing method, the method including: recording lock wait information that was generated in a database into a lock wait log file for subsequent querying. In an exemplary embodiment, lock wait information can be recorded in real time, and all the lock wait information can be recorded.

In at least one embodiment of the present disclosure, if a lock wait is generated when a service thread executes a transaction, then it is necessary to find all other transactions that block the current transaction, and write a timestamp of the moment when the lock wait occurs, information related to a requesting transaction and information related to a blocking transaction into a global buffer. A lock wait log collection thread reads the global buffer for lock wait information once at preset time intervals (e.g. one second) or when woken up (receiving a wake-up instruction), and writes buffered content into a lock wait log. In order to reduce performance loss brought about by the recording of the lock wait log to the greatest extent, in an embodiment of the present disclosure, a dual-buffer mode for lock wait information is designed: a log collection thread acquires a buffer I into which lock wait information has been written, and then a buffer II is provided to a service thread for use. Switching between the two buffers is realized through the log collection thread, so as to ensure that the service thread is not blocked when the log collection thread writes a log file, thereby improving the system performance.

Figure 1:
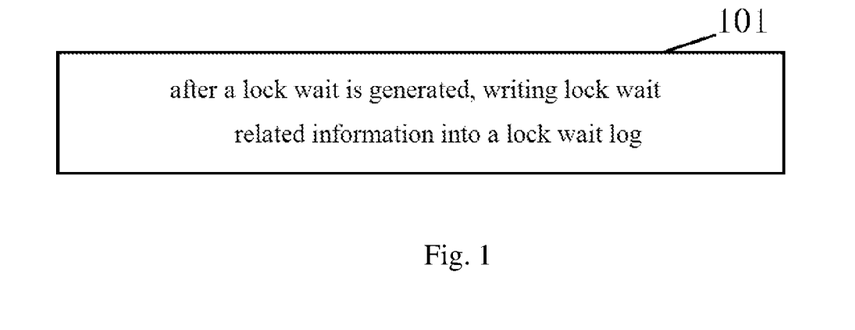
FIG. 1 is a flowchart of a database processing method according to an embodiment of the present disclosure.

As shown in FIG. 1, an embodiment of the present disclosure provides a database processing method, including:

step 101, after a lock wait is generated, writing lock wait related information into a lock wait log.

According to the solution provided by the embodiment, the lock wait information is recorded into the lock wait log, which facilitates subsequent querying of the lock wait information and tracing of historical lock wait information, thereby reducing the difficulty and cost of operation and maintenance, and improving the operation and maintenance efficiency for a database.

In an embodiment, in the step 101, after the lock wait is generated, writing the lock wait related information into the lock wait log includes:

after a lock wait is generated, a service thread writes lock wait related information into lock wait information buffers; and a log collection thread acquires the lock wait information buffers, and writes the lock wait related information in the lock wait information buffers into a lock wait log.

It should be noted that, in other embodiments, it also can be the service thread that writes the lock wait information into the lock wait log.

In an exemplary embodiment, the lock wait information buffer is a global buffer.

According to the solution provided by the embodiment, a mechanism of asynchronously writing a log at the background by a log collection thread avoids a service thread from generating an additional IO operation, and avoids the impact on the database performance.

In an exemplary embodiment, the lock wait related information includes at least one of the following: the moment when the lock wait is generated (for example, a timestamp that records a lock wait generation moment), information related to a requesting transaction, and information related to a blocking transaction. In an exemplary embodiment, the requesting transaction refers to a transaction that is blocked since a lock is requested; and a blocking transaction refers to a transaction that blocks the current requesting transaction since the lock has been obtained.

In an embodiment, the information related to the requesting transaction includes at least one of the following: the number of a chain where the requesting transaction is located, a transaction number, a lock number, a lock type and lock wait time. It should be noted that it is only exemplary here, other information related to the requesting transaction can also be included.

In an embodiment, the information related to the blocking transaction includes at least one of the following: the number of a chain where the blocking transaction is located, a transaction number, a lock number and a lock type. It should be noted that it is only exemplary here, other information related to the blocking transaction can also be included.

In an exemplary embodiment, one requesting transaction may have a plurality of blocking transactions. The information related to the requesting transaction and the information related to corresponding blocking transactions thereof can be written in pair.

In an embodiment, the method further includes: when a database is started, creating the log collection thread and the lock wait information buffers.

In an embodiment, the step of the log collection thread acquiring the lock wait information buffers includes: the log collection thread acquiring the lock wait information buffers when a preset condition is met.

In an embodiment, the preset condition being met includes: receiving a wake-up instruction, or reaching a wake-up time. The wake-up can be periodic, for example, taking 1 s as a cycle, a wake-up time is reached every 1s. The wake-up instruction can be sent to the log collection thread by the service thread. For example, when the service thread writes lock wait related information into a buffer, if it is found that the buffer is full, the wake-up instruction is sent to the log collection thread, so that the lock wait related information in the buffer is fetched and written into a lock wait log. It should be noted that the above-mentioned preset condition is only exemplary, and other conditions can be set according to needs.

In an exemplary embodiment, the lock wait information buffers can include at least two buffers, for example, including two buffers. The service thread uses one of the two buffers. When the log collection thread uses the buffer that is currently used by the service thread, the service thread is notified to use another buffer. In this way, mutual blocking between the service thread and the log collection thread can be avoided, thereby improving the concurrent performance.

In an embodiment, the step of acquiring the lock wait information buffers includes: acquiring a first buffer of the lock wait information buffers that is used by the service thread.

After acquiring the lock wait information buffers, the method further includes: the service thread switches to use a second buffer of the lock wait information buffers. It should be noted that the first buffer and the second buffer only refer to two buffers of lock wait information buffers in a general sense, and neither of them corresponds to a specific buffer.

In the solution provided by the embodiment, a dual-buffer mechanism avoids a service thread and a background log write thread from blocking each other due to contending for the same buffer, improves the concurrency of the service thread, and avoids the reduction of the database performance.

In an embodiment, the method further includes: when a database is shut down, shutting down the log collection thread and releasing the lock wait information buffers.

Figure 2:
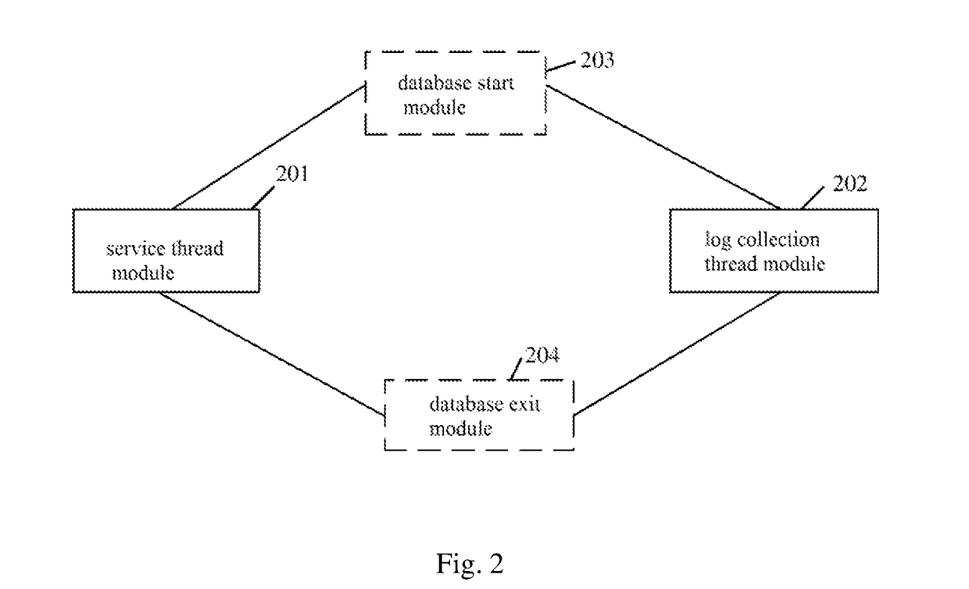
FIG. 2 is a schematic diagram of a database processing apparatus according to an embodiment of the present disclosure.

An embodiment of the present disclosure provides a database processing apparatus, as shown in FIG. 2, including:

a service thread module 201, configured to write lock wait related information into lock wait information buffers when a lock wait is generated; and a log collection thread module 202, configured to acquire the lock wait information buffers, and write the lock wait related information in the lock wait information buffers into a lock wait log.

In an embodiment, the log collection thread module 202 acquiring the lock wait information buffers includes: acquiring a first buffer in the lock wait information buffers that is used by the service thread.

The log collection thread module 202 is further configured to after acquiring the lock wait information buffers, make the service thread module 201 switch to use a second buffer of the lock wait information buffers. It should be noted that the first buffer and the second buffer only refer to two buffers of lock wait information buffers in a general sense, and neither of them corresponds to a specific buffer.

In an exemplary embodiment, the service thread module 201 is further configured to execute a transaction.

In an embodiment, the database processing apparatus further includes: a database start module 203.

The database start module 203 is configured to create the log collection thread module and the lock wait information buffers when a database is started. The database start module 203 is further used for creating a lock wait log file.

In an embodiment, the database processing apparatus further includes: a database exit module 204.

The database exit module 204 is configured to shut down the log collection thread module and release the lock wait information buffers when a database is shut down. Specifically, the service thread module 201 and the log collection thread module 202 are notified to exit.

The present disclosure will be further described below through specific instances.

Figure 3:
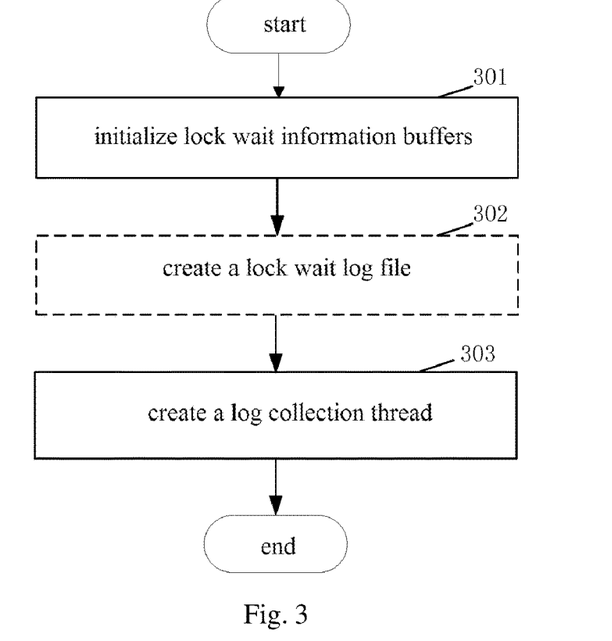
FIG. 3 is a flowchart of steps executed by a database start module according to an embodiment of the present disclosure.

FIG. 3 is a flowchart of steps executed by a database start module according to an embodiment of the present disclosure. As shown in FIG. 3, the steps executed by the database start module 203 include the following.

At step 301, lock wait information buffers is initialized.

In this step, lock wait information buffers are allocated to lock wait information, where the lock wait information buffers include two buffers. During a process of a log collection thread writing content of one buffer into a file, a service thread turns to use another buffer. A dual-buffer mechanism ensures that there is no conflict when the service thread and the log collection thread use buffers, thereby improving the concurrent performance.

At step 302, a lock wait log file is created.

The lock wait information temporarily stored in the lock wait information buffers is finally made to be persistent in the lock wait log file. It should be noted that if a lock wait log file has been established before the database is started, the step 302 can also not be executed.

At step 303, a log collection thread is created.

After the initialization of the lock wait information buffers is completed in a start phase, the database creates the log collection thread. The log collection thread is responsible for writing the lock wait related information in the lock wait information buffers into a lock wait log.

It should be noted that the above-mentioned steps 301-303 do not have a specific sequence, and an execution sequence thereof can be adjusted.

Figure 4:
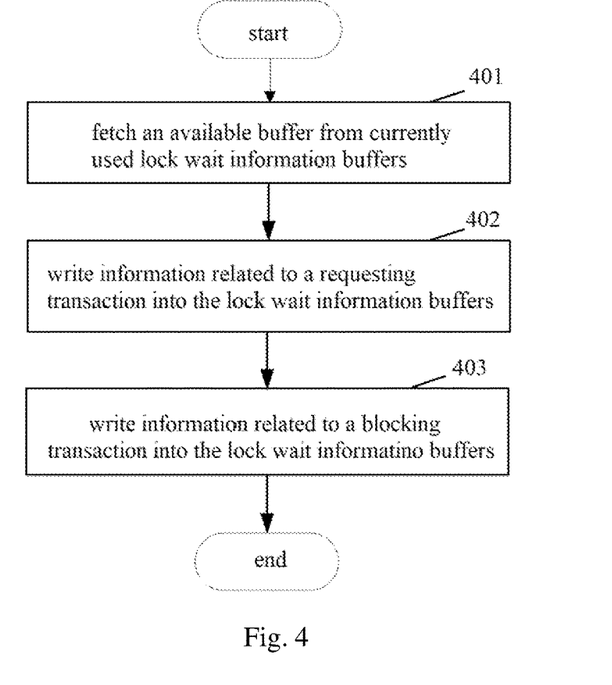
FIG. 4 is a flowchart of steps executed by a service thread module according to an embodiment of the present disclosure.

FIG. 4 is a flowchart of steps executed by a service thread module 201 according to an embodiment of the present disclosure. The function of writing lock wait transaction information into a buffer is added to an original flow. In a process of applying for a lock, if the service thread finds that there have been other transactions that apply for the lock, information of the present transaction and information of the other transactions that have applied for the lock are stored in a buffer of the lock wait information buffers.

As shown in FIG. 4, the steps executed by the service thread module 201 include the following.

At step 401, a service thread fetches an available buffer from currently used lock wait information buffers.

At step 402, the service thread writes information related to a requesting transaction into the lock wait information buffers.

At step 403, the service thread writes information related to a blocking transaction into the lock wait information buffers.

It should be noted that the-mentioned step 402 and step 403 do not have a sequential relationship, and it is possible to execute step 403 first and then execute step 402.

It should be noted that a lock wait generation moment can also be written into the lock wait information buffers. After the service thread saves lock wait information, the service thread module 201 enters a lock wait mode.

Figure 5:
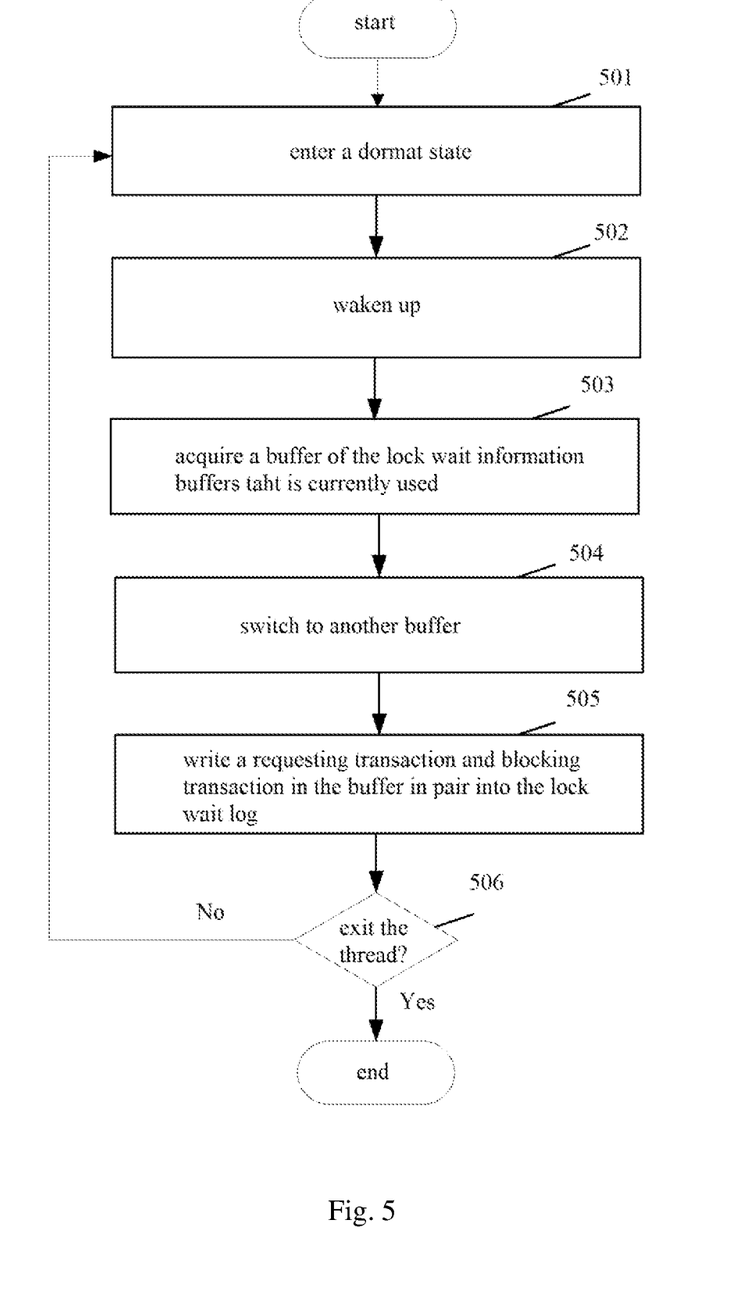
FIG. 5 is a flowchart of steps executed by a log collection module according to an embodiment of the present disclosure.

FIG. 5 is a flowchart of steps executed by a log collection module 202 according to an embodiment of the present disclosure. As shown in FIG. 5, the steps executed by the log collection thread module 202 include the following.

At step 501, a log collection thread enters a dormant state. For example, the log collection thread enters the dormant state after started.

At step 502, the log collection thread is waken up or expires for one second. In the embodiment, a wake-up cycle is one second.

At step 503, a buffer that is currently used by a service thread, such as a buffer 1, is acquired from the lock wait information buffers.

At step 504, the service thread switches to use another buffer (e.g. a buffer 2) of the lock wait information buffers.

At step 505, lock wait information saved in the buffer 1 is written into a lock wait log file.

At step 506, the log collection thread module 202 determines whether the log collection thread is exited, if so, the process ends, and if not, it returns to the step 501.

Figure 6:
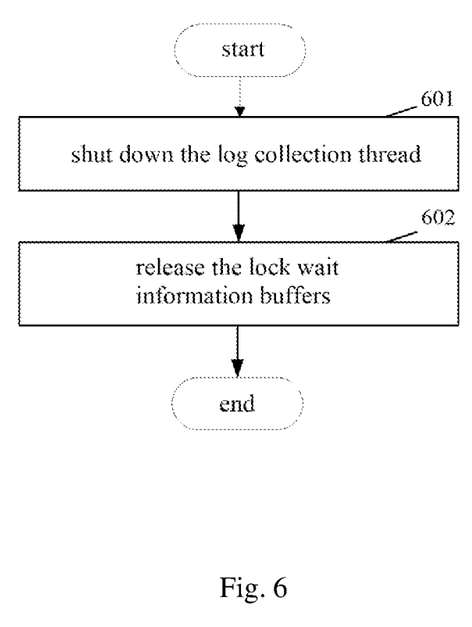
FIG. 6 is a flowchart of steps executed by a database exit module according to an embodiment of the present disclosure.

FIG. 6 is a flowchart of steps executed by a database exit module 204 according to an embodiment of the present disclosure. As shown in FIG. 6, the function of shutting down a log collection thread and releasing lock wait information buffers is added to an original flow.

As shown in FIG. 6, the steps executed by the database exit module 204 include the following.

At step 601, the log collection thread is shut down.

At step 602, the lock wait information buffers are released.

In an embodiment of the present disclosure, lock wait information is written into a buffer by a service thread, and a log collection thread records the lock wait information in the buffer into a log file, so as to facilitate tracing of historical lock wait information, thereby reducing the difficulty and cost of operation and maintenance. A mechanism of asynchronously writing a log at the background avoids a service thread from generating an additional IO operation. By using the dual-buffer mechanism of asynchronously writing a log at the background, the solution does not reduce the database performance. The dual-buffer mechanism avoids a service thread and a background log write thread from blocking each other due to contending for the same buffer, and improves the concurrency of the service thread.

The solutions provided by the embodiments of the present disclosure are applicable to all relational databases. Description will be provided below in conjunction with examples.

Example 1

Figure 7:
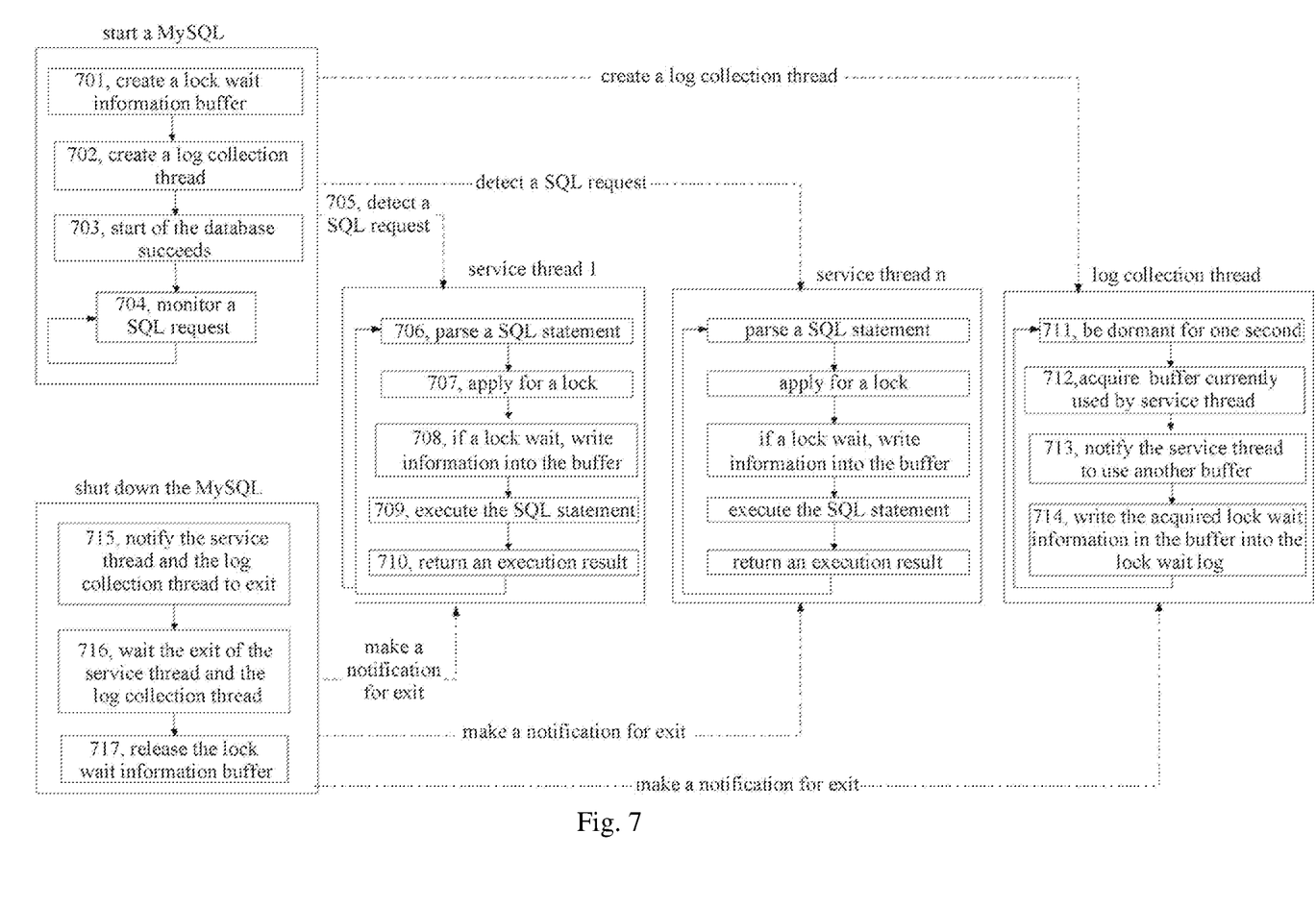
FIG. 7 is a flowchart of a MySQL database processing method according to an embodiment of the present disclosure.

The example provides a method for recording historical lock wait information based on a MySQL database. As shown in FIG. 7, the method for recording historical lock wait information based on a MySQL database includes the following.

(1) A MySQL is started.

At step 701, in a MySQL start process, a lock wait information buffer for storing lock wait information is created.

At step 702, a log collection thread is created.

At step 703, the start of the database succeeds.

At step 704, a SQL request from a client is recurrently monitored.

(2) A service thread is created.

At step 705, After the start of the MySQL is completed, the MySQL starts to monitor a connection request from a client, and after detecting a connection request, creates a chain to receive a SQL request on the chain and creates a service thread to process requests.

At step 706, a received SQL statement is parsed.

At step 707, a lock is applied for the SQL statement.

At step 708, during a lock application process, if it is found that there is a lock wait, information related to a requesting transaction and information related to all blocking transactions are written into a lock wait information buffer.

At step 709, after the execution of the blocking transactions ends, a lock can be obtained through application for the requesting transaction, and the SQL statement is then executed.

At step 710, the client is replied with a response.

The method proceeds to receive a SQL request, and the steps 705-710 are repeatedly executed after a request is received.

(3) A log collection thread is created.

The log collection thread is created in a database start phase, and writes lock wait information into a log file.

At step 711, a log collection thread is dormant for one second.

At step 712, the log collection thread acquires, under the protection of mutex, a buffer that is currently used by the service thread, and at this time, the service thread is blocked.

At step 713, the log collection thread makes the service thread switch to use another buffer, and releases the mutex acquired at the step 712, and the service thread can thus continue running.

At step 714, the log collection thread writes content of the buffer acquired at the step 712 into the lock wait log file, and it returns to the step 711.

(4) The MySQL is shut down.

The MySQL starts to shut down the database after receiving a shutdown command. Other operations in a database shutdown phase are omitted, and only the steps related to the present solution will be introduced below.

At step 715, the service thread is notified to exit, and the log collection thread is notified to exit.

At step 716, it waits for the completion of the exit of the service thread and the exit of the log collection thread.

At step 717, the lock wait information buffer is released.

Example 2

Figure 8:
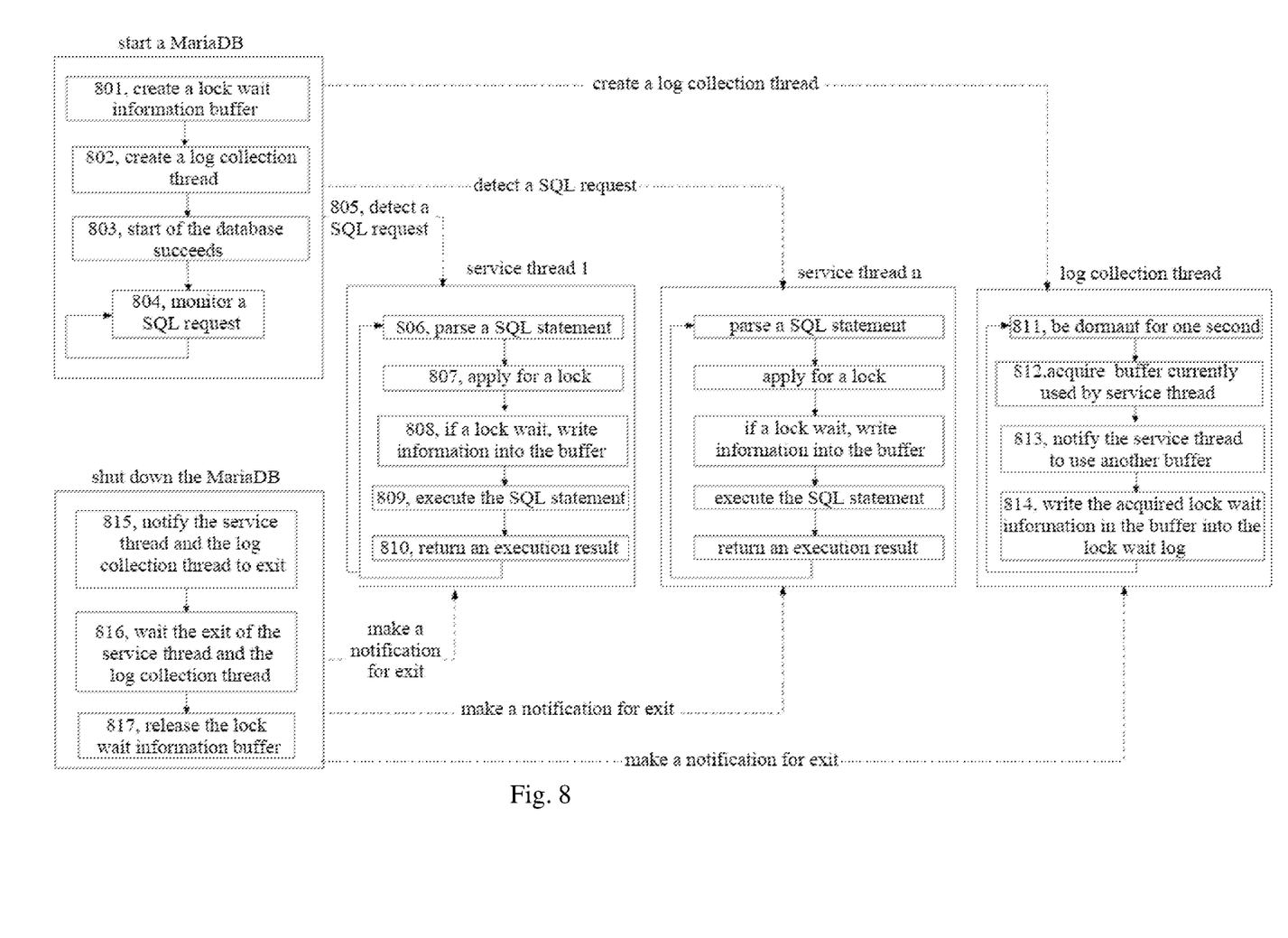
FIG. 8 is a flowchart of a MariaDB database processing method according to an embodiment of the present disclosure.

The example provides a method for recording historical lock wait information based on a Mariadb. As shown in FIG. 8, the method for recording historical lock wait information based on a Mariadb includes the following.

(1) A MariaDB is Started.

At step 801, in a MariaDB start process, a lock wait information buffer for storing lock wait information is created.

At step 802, a log collection thread is created.

At step 803, the start of the database succeeds.

At step 804, a SQL request from a client is recurrently monitored.

(2) A Service Thread is Created.

At step 805, After the start of the MariaDB is completed, the MySQL starts to monitor a connection request from a client, and after detecting a connection request, creates a chain to receive a SQL request on the chain and creates a service thread to process requests.

At step 806, a received SQL statement is parsed.

At step 807, a lock is applied for the SQL statement.

At step 808, during a lock application process, if it is found that there is a lock wait, information related to a requesting transaction and information related to all blocking transactions are written into a lock wait buffer.

At step 809, after the execution of the blocking transactions ends, a lock can be obtained through application for the requesting transaction, and the SQL statement is then executed.

At step 810, the client is replied with a response.

The method proceeds to receive a SQL request, and the steps 805-710 are repeatedly executed after a request is received.

(3) A Log Collection Thread is Created.

The log collection thread is created in a database start phase, and is responsible for writing lock wait information into a log file.

At step 811, a log collection thread is dormant for one second.

At step 812, the log collection thread acquires, under the protection of mutex, a buffer that is currently used by the service thread, and at this time, the service thread is blocked.

At step 813, the log collection thread makes the service thread switch to use another buffer, and releases the mutex acquired at the step 812, and the service thread can thus continue running.

At step 814, the log collection thread writes content of the buffer acquired at the step 812 into the lock wait log file, and it returns to the step 811.

(4) The MariaDB is Shut Down.

The MariaDB starts to shut down the database after receiving a shutdown command. Other operations in a database shutdown phase are omitted, and only the steps related to the present solution will be introduced below.

At step 815, the service thread is notified to exit, and the log collection thread is notified to exit.

At step 816, it waits for the completion of the exit of the service thread and the exit of the log collection thread.

At step 817, the lock wait information buffer is released.

Example 3

Figure 9:
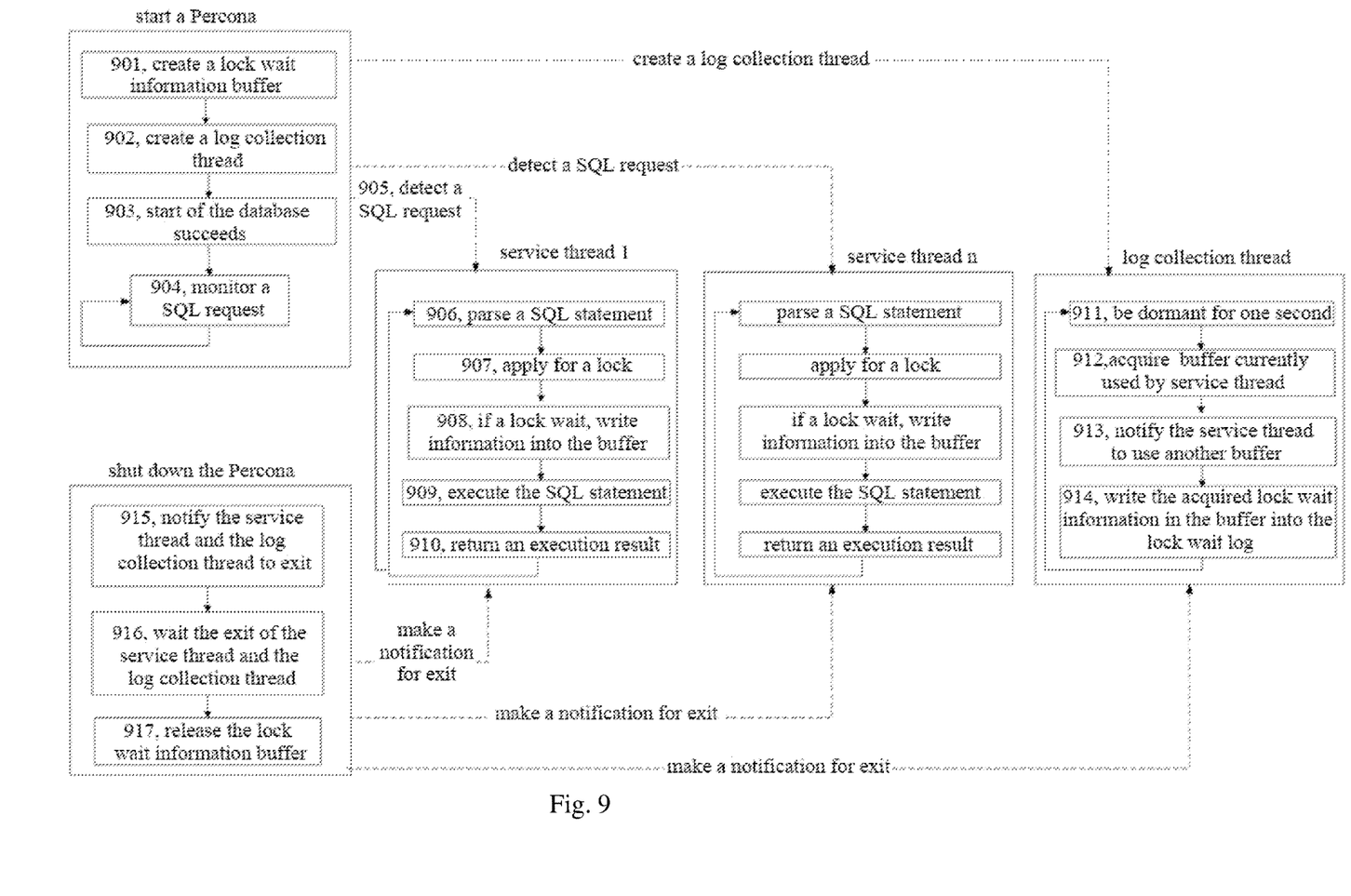
FIG. 9 is a flowchart of a Percona database processing method according to an embodiment of the present disclosure.

The example provides a method for recording historical lock wait information based on a Percona database. As shown in FIG. 9, the method includes:

(1) A Percona is Started.

At step 901, in a Percona start process, a lock wait information buffer for storing lock wait information is created.

At step 902, a log collection thread is created.

At step 903, the start of the database succeeds.

At step 904, a SQL request from a client is recurrently monitored.

(2) A Service Thread is Created.

At step 905, After the start of the Percona is completed, the Percona starts to monitor a connection request from a client, and after detecting a connection request, creates a chain to receive a SQL request on the chain and creates a service thread to process requests.

At step 906, a received SQL statement is parsed.

At step 907, a lock is applied for the SQL statement.

At step 908, during a lock application process, if it is found that there is a lock wait, information related to a requesting transaction and information related to all blocking transactions are written into a lock wait buffer.

At step 909, after the execution of the blocking transactions ends, a lock can be obtained through application for the requesting transaction, and the SQL statement is then executed.

At step 910, the client is replied with a response.

The method proceeds to receive a SQL request, and the steps 905-910 are repeatedly executed after a request is received.

(3) A Log Collection Thread is Created.

The log collection thread is created in a database start phase, and is responsible for writing lock wait information into a log file.

At step 911, a log collection thread is dormant for one second.

At step 912, the log collection thread acquires, under the protection of mutex, a buffer that is currently used by the service thread, and at this time, the service thread is blocked.

At step 913, the log collection thread makes the service thread switch to use another buffer, and releases the mutex acquired at the step 912, and the service thread can thus continue running.

At step 914, content of the buffer acquired at the step 912 is written into the lock wait log file, and it returns to the step 911.

(4) The Percona is Shut Down.

The Percona starts to shut down the database after receiving a shutdown command. Other operations in a database shutdown phase are omitted, and only the steps related to the present solution will be introduced below.

At step 915, the service thread is notified to exit, and the log collection thread is notified to exit.

At step 916, it waits for the completion of the exit of the service thread and the exit of the log collection thread.

At step 917, the lock wait information buffer is released.

Example 4

Figure 10:
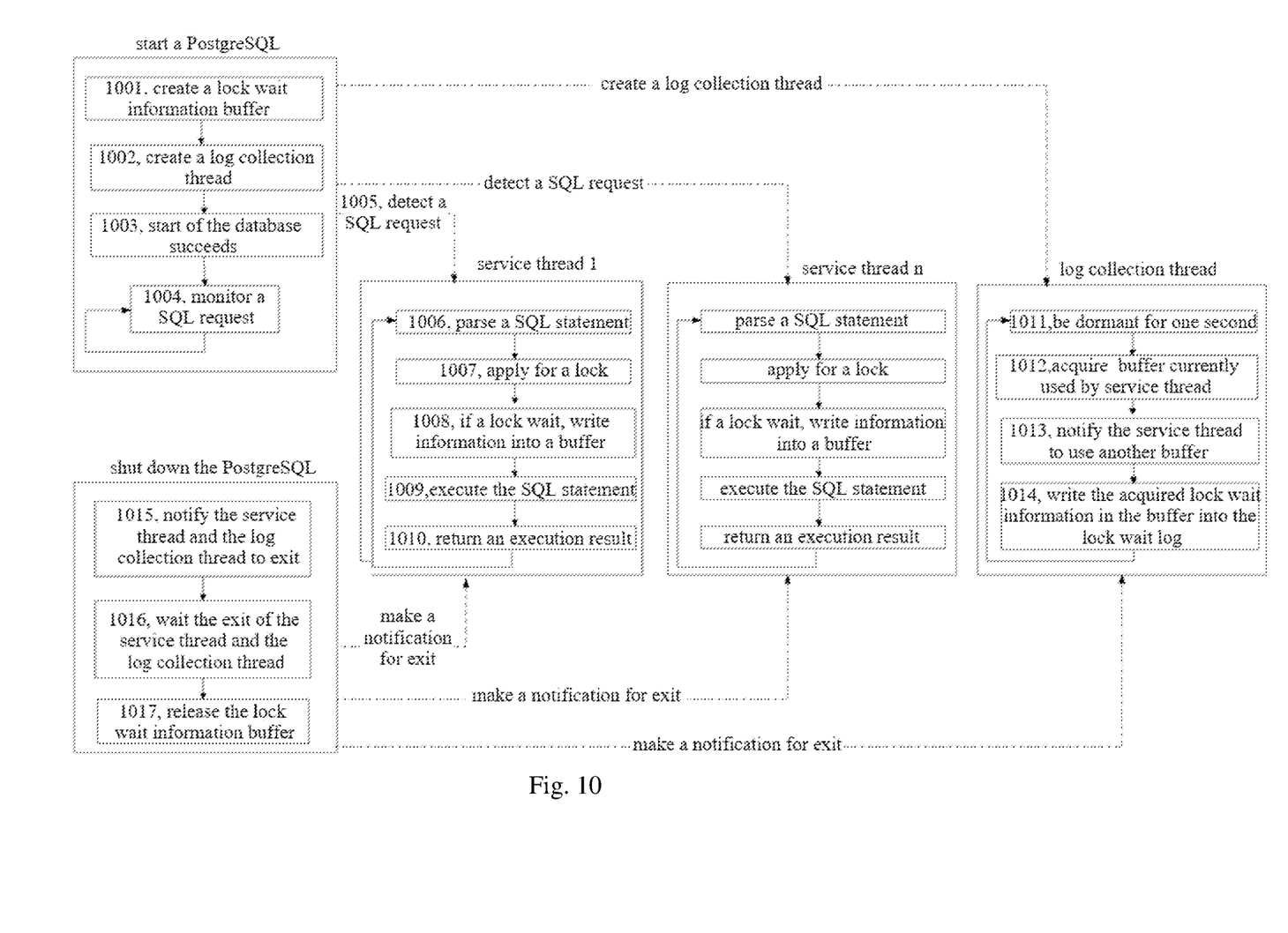
FIG. 10 is a flowchart of a PostgreSQL database processing method according to an embodiment of the present disclosure.

The example provides a method for recording historical lock wait information based on a PostgreSQL database. As shown in FIG. 10, the method includes:

(1) A PostgreSQL is Started.

At step 1001, in a PostgreSQL start process, a lock wait information buffer for storing lock wait information is created.

At step 1002, a log collection thread is created.

At step 1003, the start of the database succeeds.

At step 1004, a SQL request from a client is recurrently monitored.

(2) A Service Thread is Created.

At step 1005, after the start of the PostgreSQL is completed, the PostgreSQL starts to monitor a connection request from a client, and after detecting a connection request, creates a chain to receive a SQL request on the chain and creates a service thread to process requests.

At step 1006, a received SQL statement is parsed.

At step 1007, a lock is applied for the SQL statement.

At step 1008, during a lock application process, if it is found that there is a lock wait, information related to a requesting transaction and information related to all blocking transactions are written into a lock wait buffer.

At step 1009, after the execution of the blocking transactions ends, a lock can be obtained through application for the requesting transaction, and the SQL statement is then executed.

At step 1010, the client is replied with a response.

The method proceeds to receive a SQL request, and the steps 1005-1010 are repeatedly executed after a request is received.

(3) A Log Collection Thread is Created.

The log collection thread is created in a database start phase, and is responsible for writing lock wait information into a log file.

At step 1011, a log collection thread is dormant for one second.

At step 1012, the log collection thread acquires, under the protection of mutex, a buffer that is currently used by the service thread, and at this time, the service thread is blocked.

At step 1013, the log collection thread makes the service thread switch to use another buffer, and releases the mutex acquired at the step 1012, and the service thread can thus continue running.

At step 1014, the log collection thread writes content of the buffer acquired at the step 1012 into the lock wait log file, and it returns to the step 1011 to reexecute.

(4) The PostgreSQL is Shut Down.

The PostgreSQL starts to shut down the database after receiving a shutdown command. Other operations in a database shutdown phase are omitted, and only the steps related to the present solution will be introduced below.

At step 1015, the service thread is notified to exit, and the log collection thread is notified to exit.

At step 1016, it waits for the completion of the exit of the service thread and the exit of the log collection thread.

At step 1017, the lock wait information buffer is released.

It should be noted that the above-mentioned various databases are only exemplary, the present disclosure is not limited to these, and other databases can also be applied to the present disclosure.

After a database is started, the creation of both a global buffer for lock wait information and a lock wait log collection thread are completed. The implementation of the technical solution during a transaction running process will be further described below in details in conjunction with the accompanying drawings.

Figure 11:
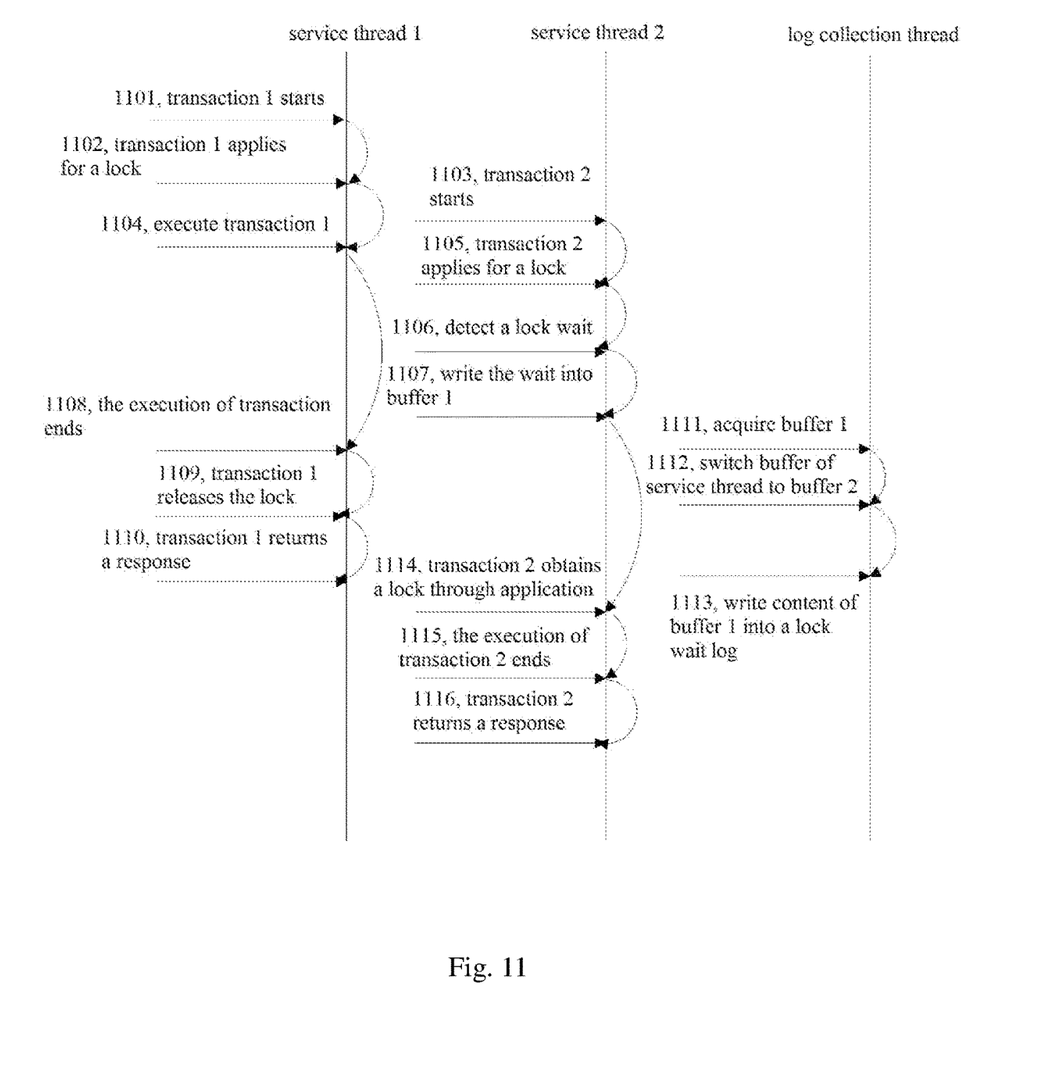
FIG. 11 is a timing diagram of transaction execution according to an embodiment of the present disclosure.

As shown in FIG. 11, the implementation of the technical solution during a transaction running process includes the following.

At step 1101, a service thread 1 starts a transaction 1.

At step 1102, the transaction 1 applies for a lock.

At step 1103, a service thread 2 starts a transaction 2.

At step 1104, the transaction 1 starts to be executed.

At step 1105, the transaction 2 applies for a lock.

At step 1106, the transaction 2 detects a lock wait.

At step 1107, the service thread 2 writes information related to the transaction 2 (a requesting transaction) and the transaction 1 (a blocking transaction) into a buffer 1.

At step 1108, the execution of the transaction 1 ends.

At step 1109, the transaction 1 releases the lock.

At step 1110, the transaction 1 replies the client with a response.

At step 1111, a log collection thread acquires the buffer (i.e., the buffer 1) that is currently used by the service thread.

At step 1112, the log collection thread makes the service thread switch to use a buffer 2.

At step 1113, the log collection thread writes content of the buffer 1 into a lock wait log file.

At step 1114, the transaction 2 obtains a lock through application.

At step 1115, the execution of the transaction 2 ends.

At step 1116, the transaction 2 replies the client with a response.

Figure 12:
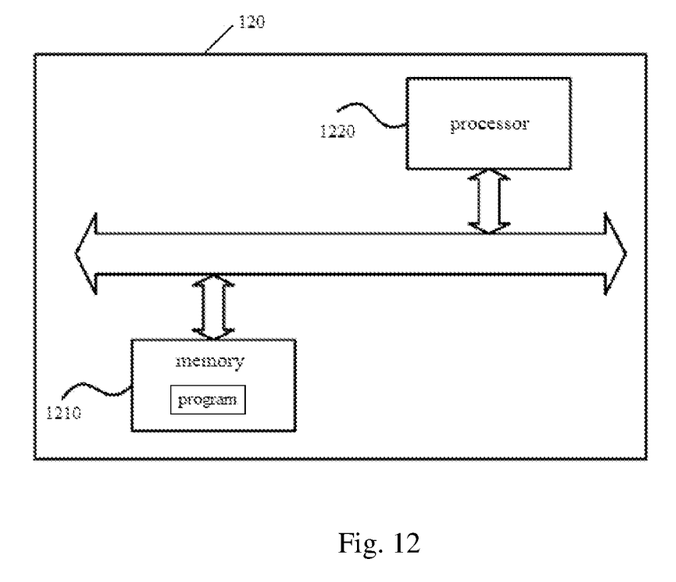
FIG. 12 is a block diagram of a database processing apparatus according to an embodiment of the present disclosure.

As shown in FIG. 12, an embodiment of the present disclosure provides a database processing apparatus 120, including a memory 1210 and a processor 1220. The memory 1210 stores a program, and the program, when read and executed by the processor 1220, implements the database processing method of any one of the embodiments.

Figure 13:
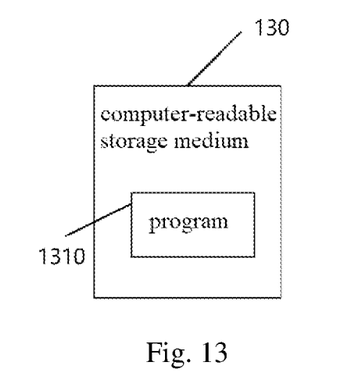
FIG. 13 is a block diagram of a computer-readable storage medium according to an embodiment of the present disclosure.

As shown in FIG. 13, an embodiment of the present disclosure provides a computer-readable storage medium 130. The computer-readable storage medium 130 stores one or more programs 1310, and the one or more programs 1310 may be executed by one or more processors to implement the database processing method of any one of the embodiments.

It can be understood by those of ordinary skill in the art that all or some of the steps in the methods disclosed above, a system, and a function module/unit in an apparatus can be embodied as software, firmware, hardware and a suitable combination thereof. In the hardware implementation, the division of the function modules/units mentioned in the above description does not necessarily correspond to the division of physical components. For example, one physical component can have a plurality of functions, or one function or step can be executed by several physical components in cooperation. Some components or all the components can be embodied as software that is executed by a processor, such as a digital signal processor or a microprocessor, or be embodied as hardware, or be embodied as an integrated circuit, such as an application specific integrated circuit (ASIC). Such software can be distributed on a computer-readable storage medium, and the computer-readable storage medium can include a computer storage medium (or a non-transitory medium) and a communication medium (or a transitory medium). As is known to one of ordinary skill in the art, the term of computer storage medium, includes volatile and non-volatile, removable and non-removable media implemented in any method or technology for storing information such as computer-readable instructions, data structures, program modules, or other data. The computer storage medium includes, but not limited to an RAM, an ROM, an EEPROM, a flash memory or other storage techniques, a CD-ROM, a digital versatile disc (DVD) or other optical disc memory, a cassette tape, tape or disc memory or other magnetic storage, or any other medium that can be used to store desired information and that can be accessed by a computer. In addition, it is well known to those of ordinary skill in the art that a communication medium generally contains computer-readable instructions, data structures, program modules or other data in a modulated data signal such as a carrier or other transmission mechanisms, and can include any information transfer medium.

The invention claimed is:

1. A database processing method, comprising:
   after a lock wait is generated, writing lock wait related information into a lock wait log,
   wherein after the lock wait is generated, a service thread writes the lock wait related information into lock wait information buffers; and a log collection thread acquires the lock wait information buffers, and writes the lock wait related information in the lock wait information buffers into the lock wait log.

2. The database processing method of claim 1, wherein the lock wait related information comprises at least one of the following: the moment when the lock wait is generated, information related to a requesting transaction, and information related to a blocking transaction.

3. The database processing method of claim 2, wherein
   the information related to the requesting transaction comprises at least one of the following: the number of a chain where the requesting transaction is located, a transaction number, a lock number, a lock type and lock wait time; and
   the information related to the blocking transaction comprises at least one of the following: the number of a chain where the blocking transaction is located, a transaction number, a lock number and a lock type.

4. The database processing method of claim 1, wherein the step of the log collection thread acquiring the lock wait information buffers comprises: the log collection thread acquiring the lock wait information buffers when a preset condition is met.

5. The database processing method of claim 4, wherein the preset condition being met comprises: receiving a wake-up instruction, or reaching a wake-up time.

6. The database processing method of claim 1, wherein the step of the log collection thread acquiring the lock wait information buffers comprises: the log collection thread acquiring a first buffer of the lock wait information buffers that is used by a service thread; and
   after the log collection thread acquires the lock wait information buffers, the database processing method further comprises: the service thread switches to use a second buffer of the lock wait information buffers.

7. The database processing method of claim 1, further comprising: when a database is started, creating the log collection thread and the lock wait information buffers.

8. The database processing method of claim 1, further comprising: when a database is shut down, shutting down the log collection thread and releasing the lock wait information buffers.

9. A database processing apparatus, comprising a memory and a processor, wherein the memory stores a program, and the program, when read and executed by the processor, implements a database processing method which comprises:
   after a lock wait is generated, writing lock wait related information into a lock wait log,
   wherein after the lock wait is generated, a service thread writes the lock wait related information into lock wait information buffers; and a log collection thread acquires the lock wait information buffers, and writes the lock wait related information in the lock wait information buffers into the lock wait log.

10. A non-transitory computer-readable storage medium, wherein the computer-readable storage medium stores one or more programs, and the one or more programs can be executed by one or more processors to implement a database processing method which comprises:
- after a lock wait is generated, writing lock wait related information into a lock wait log,
- wherein after the lock wait is generated, a service thread writes the lock wait related information into lock wait information buffers; and a log collection thread acquires the lock wait information buffers, and writes the lock wait related information in the lock wait information buffers into the lock wait log.

* * * * *